United States Patent
Brown

[11] Patent Number: 5,824,879
[45] Date of Patent: Oct. 20, 1998

[54] METHOD OF CALIBRATING AN ULTRASONIC FLOW METER

[75] Inventor: Alvin E. Brown, Santa Cruz, Calif.

[73] Assignee: Rosemount Inc., Eden Prairie, Minn.

[21] Appl. No.: 726,095

[22] Filed: Oct. 4, 1996

[51] Int. Cl.$^6$ .................................................. G01F 25/00
[52] U.S. Cl. ...................... 73/1.34; 364/571.05
[58] Field of Search ................... 73/1.34, 1.16, 73/1.27, 1.31; 364/571.01–571.08, 510

[56] References Cited

U.S. PATENT DOCUMENTS

| | | | |
|---|---|---|---|
| 3,148,527 | 9/1964 | Lindquist et al. | 73/1.34 |
| 3,981,191 | 9/1976 | Brown et al. | 73/861.28 |
| 4,509,373 | 4/1985 | Brown | 73/1.27 X |
| 4,538,446 | 9/1985 | Singh et al. | 73/1.34 |
| 4,729,247 | 3/1988 | Brown | 73/1.34 X |
| 4,989,446 | 2/1991 | Conti | 73/1.16 |
| 5,277,070 | 1/1994 | Doir | 73/861.28 |
| 5,339,816 | 8/1994 | Akomatsu et al. | 128/661.09 |
| 5,453,575 | 9/1995 | O'Donnell et al. | 128/662.06 |

FOREIGN PATENT DOCUMENTS

| | | | |
|---|---|---|---|
| 44626 | 2/1987 | Japan | 73/1.34 |
| 1059440 | 12/1983 | Russian Federation | 73/1.34 |
| 1462114 | 1/1987 | Russian Federation | 73/1.34 |

OTHER PUBLICATIONS

*Patent Abstracts of Europe* "Flow Meter" Mar. 3, 1994 (WO 09404890A1).

*Patent Abstracts of Europe* "Ultrasonic Flowmeter with Continuous Zero Flow Calibration Facility" Jan. 4, 1996 (WO 09600375A1).

*Patent Abstracts of Japan* Grp. P652, vol. 12, No. 2 Abs Pub date Jan. 7, 1988 "Calibration Method for Transmission Type Ultrasonic Flowmeter" (62–165122).

*Patent Abstracts of Japan* Grp. P694, vol.12, No.136 Abs Pub date Apr. 26, 1988 "Calibration of Ultrasonic Flowmeter" (62–257021).

*Primary Examiner*—Thomas P. Noland
*Attorney, Agent, or Firm*—Richard W. Hanes

[57] ABSTRACT

A method of calibrating an ultrasonic flow meter (10) first determines a static flow offset (52). Next, a dynamic flow offset (54) and a flow speed (56) are determined. An adjusted flow speed (58) is determined by subtracting the static flow offset and one half the dynamic flow offset from the flow speed to form an adjusted flow speed.

9 Claims, 4 Drawing Sheets

METHOD OF CALIBRATING AN ULTRASONIC FLOW METER

FIELD OF THE INVENTION

The present invention relates generally to the field of ultrasonic flow meters and more particularly to a method of calibrating an ultrasonic flow meter.

BACKGROUND OF THE INVENTION

Ultrasonic flow meters have many advantages over other methods of determining flow rates. Ultrasonic flow meters can continuously measure the flow rate, while other methods generally measure average flow rates. In addition, ultrasonic flow meters are obstructionless and work with non-conductive fluids.

Ultrasonic flow meters have a pair of transducers that are placed on either side of the flow path of a fluid flowing through a conduit. The transducers are pointed at each other and placed on either side of the flow path of a fluid flowing through a pipe. The line between the transducers has a component in the direction of the fluid flow. The principle used to detect flow rates is that the transit time of an ultrasonic packet will increase in the upstream and decrease in the downstream path. The amount by which the transit time changes is directly proportional to the flow rate. It is well known that ultrasonic flow meters have fixed offsets. Normally the offset is measured by having the ultrasonic flow meter measure the flow rate with no fluid flow through the meter. The meter should read zero so any reading is an offset that is subtracted from all future readings. This process is performed manually by adjusting a potentiometer. Unfortunately, the offset can drift over time, especially in the case of clamp-on transducers. In addition, this technique only compensates for static (no-flow) offsets and does not take into account offset that occur when a fluid is flowing through the meter.

Thus there exists a need for a calibration method that can automatically detect both static and dynamic offsets in an ultrasonic flow meter and compensate for both offsets.

SUMMARY OF THE INVENTION

A method of calibrating an ultrasonic flow meter that overcomes these and other problems first determines a static flow offset. Next, a dynamic flow offset and a flow speed are determined. An adjusted flow speed is determined by subtracting the static flow offset and one half the dynamic flow offset from the flow speed to form an adjusted flow speed.

DETAILED DESCRIPTION OF THE DRAWINGS

Figure 1:
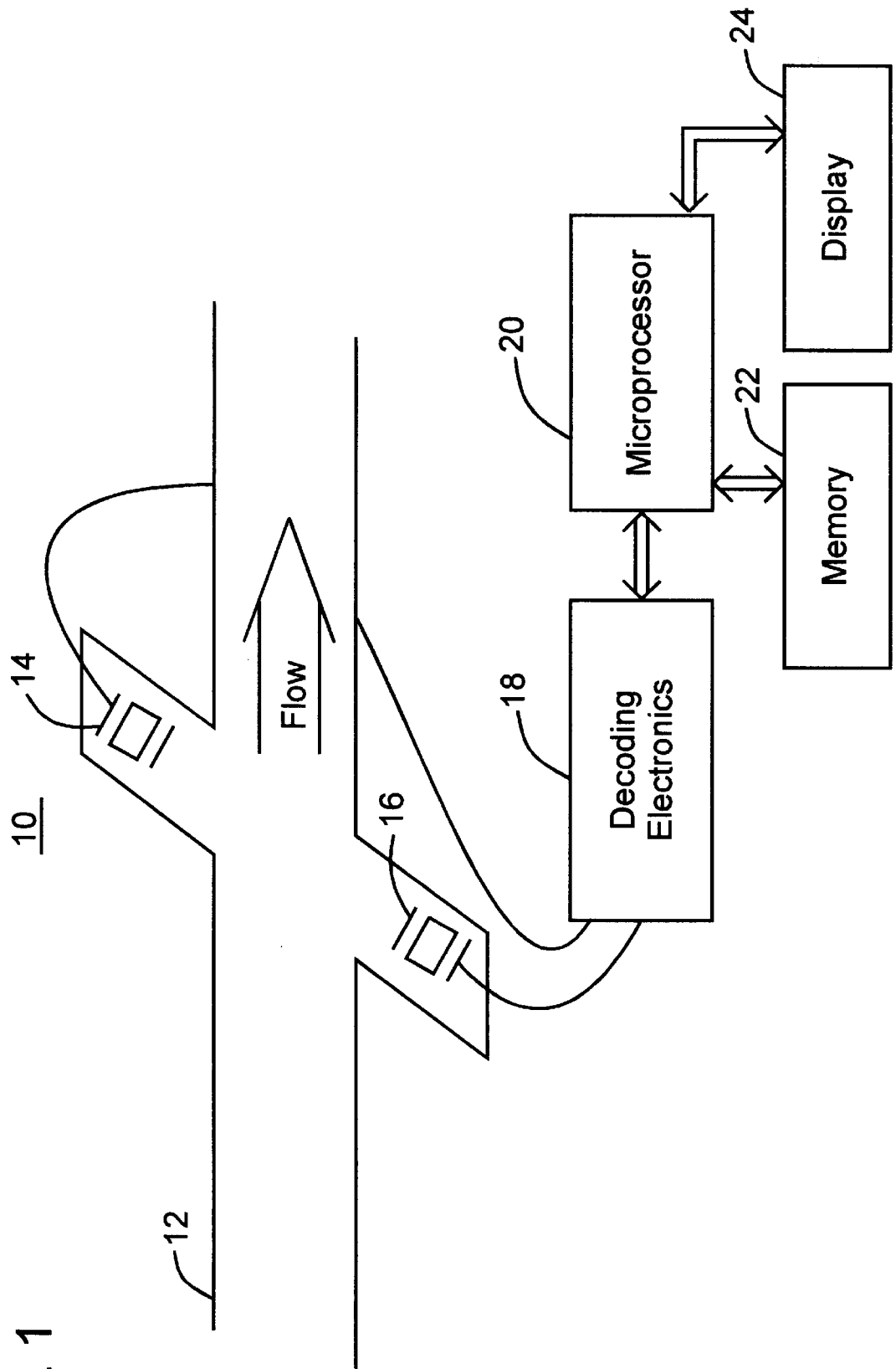
FIG. 1 is a block diagram of an ultrasonic flow meter attached to a conduit.

An ultrasonic flow meter 10 attached to a conduit 12 having a fluid flowing through it is shown in FIG. 1. The ultrasonic flow meter has a pair of transducers 14, 16. The pair of transducers 14, 16 are coupled to the decoding electronics 18, that generates and detects an ultrasonic pulse. A microprocessor 20 controls the decoding electronics 18 and performs all the necessary calculations to calibrate the ultrasonic flow meter. A series of computer instruction and data are stored in a memory 22 that is coupled to the microprocessor 20. A display 24 is also coupled to the microprocessor 20.

Figure 2:
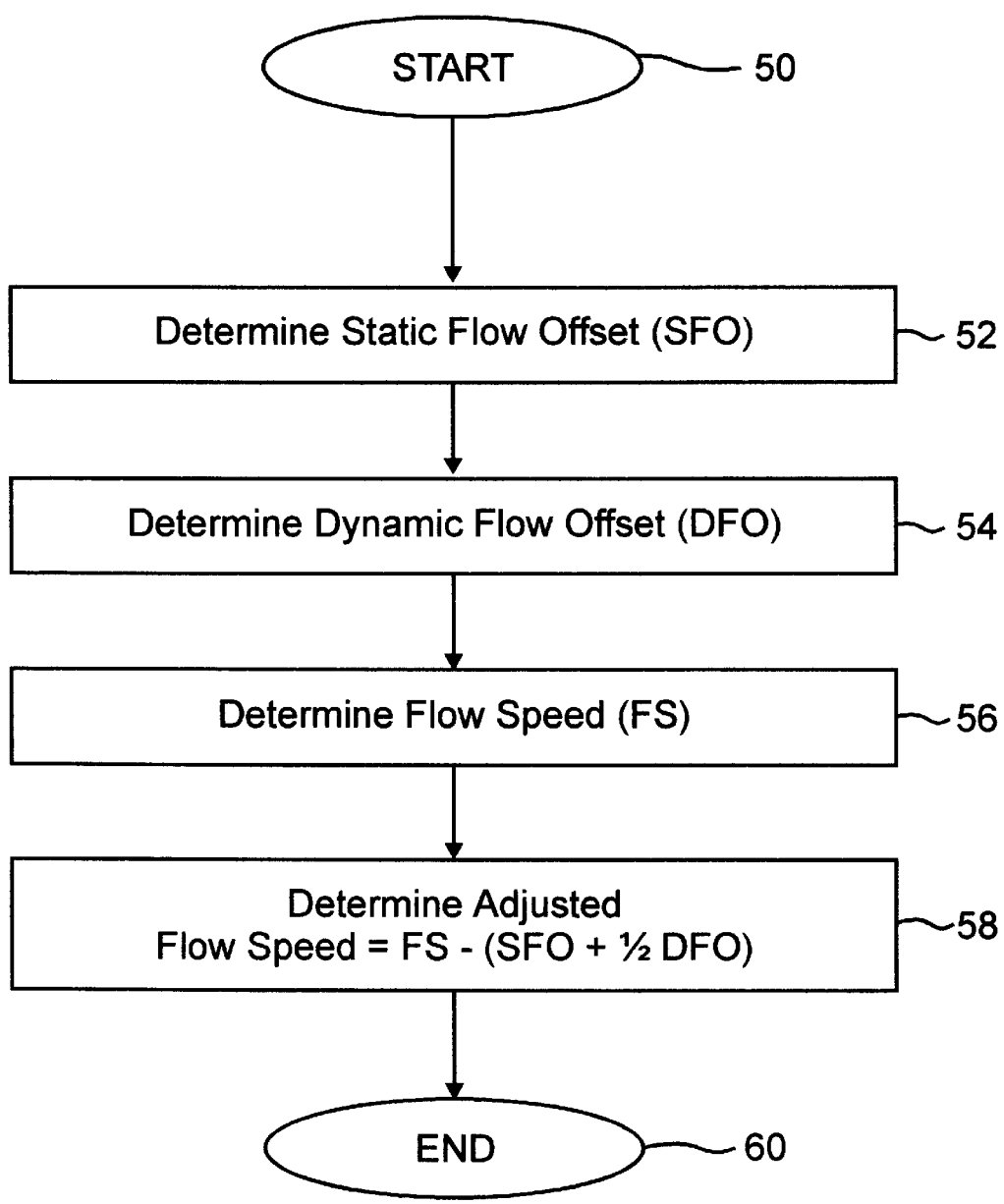
FIG. 2 is a flow chart of a process of calibrating an ultrasonic flow meter.

The process of calibrating an ultrasonic flow meter involves detecting any fixed offsets in the meter and removing these offsets. FIG. 2 is an embodiment of a process for detecting and eliminating any fixed offsets from an ultrasonic flow meter. This process can be stored as computer instruction in the memory 22 and executed by the microprocessor 20. The process starts, step 50, by determining the static flow offset at step 52. The dynamic flow offset is determined at step 54. The dynamic flow offset is determined by measuring the offset when fluid is flowing through the ultrasonic flow meter. A flow speed (measured flow speed) is measured at step 56. An adjusted flow speed is determined by subtracting the static flow offset and one half the dynamic flow offset from the flow speed at step 58, which ends the process at step 60. In another embodiment the adjusted flow speed is then used to determine a volume flow rate. The volume flow rate is the measurement that interests the customer. The adjusted flow speed is just the line integral of the speed of the fluid at each point along the line between the two transducers. As a result this has to be converted to the volume flow rate. A number of different methods exist to determine the volume flow rate from the adjusted flow rate. The invention contemplates using any of these different methods.

Figure 3:
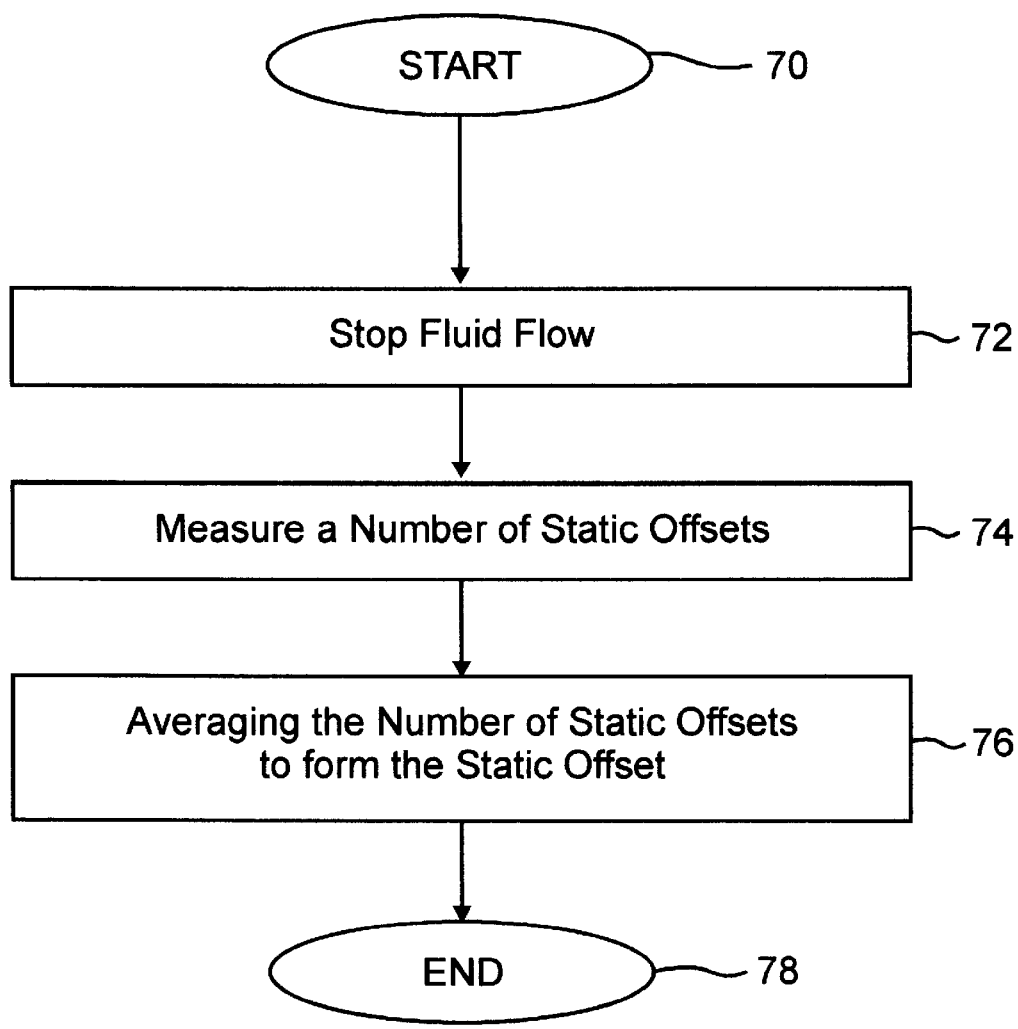
FIG. 3 is a flow chart of a process of determining a static offset in an ultrasonic flow meter.

FIG. 3 is a flow chart of a process for determining the static offset. The process starts, step 70, by stopping a flow of a fluid through the ultrasonic flow meter at step 72. Next, a number of static offsets are measured at step 74. The static offset is measured by having the ultrasonic flow meter determine a flow speed in a no-flow situation. Since the fluid is not flowing, any measured flow rate is due to the static offset. In one embodiment the ultrasonic flow meter continuously measures a plurality of static offsets (plurality of flow speeds) for a static averaging period. The plurality of static offsets are averaged at step 76 which ends the process at step 78. By averaging the static offsets, the variable errors (noise) in the measurement tend to go to zero, since the variable errors should be just as likely to be positive as negative.

Figure 4:
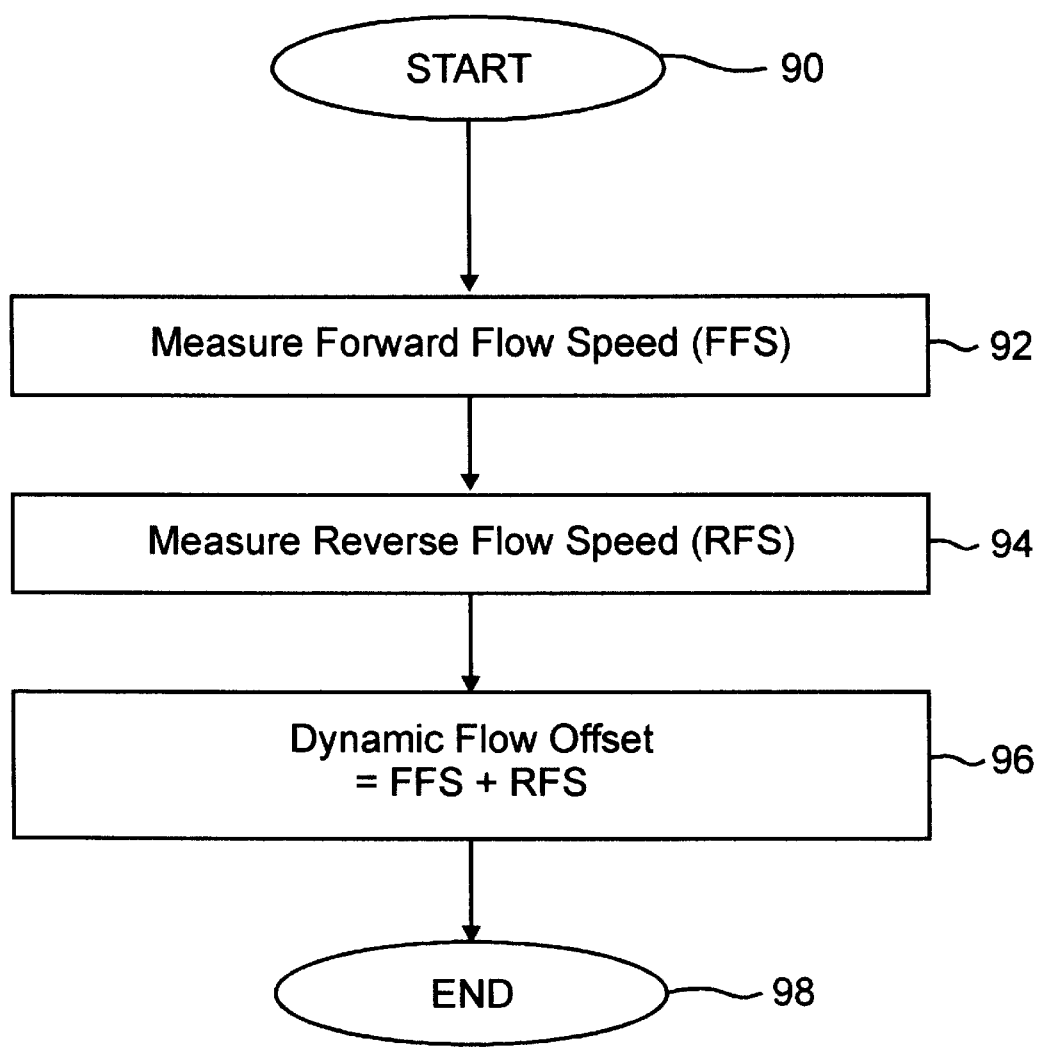
FIG. 4 is a flow chart of a process of determining a dynamic offset in an ultrasonic flow meter.

FIG. 4 is a process for measuring a dynamic offset. The process starts, step 90, by measuring a forward flow speed at step 92 under a flowing condition. A forward flow speed is measured by making the transducer 16 (see FIG. 1) a transmit transducer when measuring the downstream transit time and making the transducer 14 the transmit transducer when measuring the upstream transit time. Using these two transit times a flow speed is calculated for a forward flow situation. Next, the reverse flow speed is measured at step 94. The reverse flow speed is measured by making the transducer 14 the transmit transducer when measuring the downstream transit time and making the transducer 16 the transmit transducer when measuring the upstream transit time. The dynamic flow offset is then calculated as the sum of the forward flow speed and the reverse flow speed at step 96, which ends the process, step 98. When there is no dynamic flow offset, the sum of the forward flow speed and the reverse flow speed is zero. This because the reverse flow speed has the same magnitude but the opposite sign as the forward flow speed. The dynamic offset is divided by two, because the offset in the forward flow speed adds to the offset of the reverse flow speed. As in the static case the a plurality of flow speeds can be measured for both the forward flow situation and the reverse flow situation. Then if the plurality of flow speeds are averaged the random variations in the measurements tends toward zero. Since the dynamic offset can be calculated with the fluid flowing, the dynamic offset can be periodically recalculated while the ultrasonic flow meter is in use.

Thus there has been described a process for calibrating an ultrasonic flow meter that compensates for both dynamic and static offsets. While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A method of calibrating an ultrasonic flow meter, comprising the steps of:
   (a) determining a static flow offset;
   (b) determining a dynamic flow offset;
   (c) determining a flow speed; and
   (d) subtracting the static flow offset and one half the dynamic flow offset from the flow speed to form an adjusted flow speed.

2. The method of claim 1, further including the step of:
   (e) determining a volume flow rate from the adjusted flow speed.

3. The method of claim 1, wherein step (a) further includes the steps of:
   (a1) stopping a flow of a fluid through the ultrasonic flow meter to form a no-flow situation;
   (a2) setting a static averaging period;
   (a3) measuring a plurality of static offsets;
   (a4) calculating an average of the plurality of static offsets to form the static offset.

4. The method of claim 3, further including the step of storing the static offset in a memory.

5. The method of claim 1, wherein step (b) further includes the steps of:
   (b1) allowing a flow of a fluid through the ultrasonic flow meter;
   (b2) measuring a flow speed in a forward flow situation, to form a forward flow speed;
   (b3) measuring a flow speed in a reverse flow situation, to form a reverse flow speed;
   (b4) adding the forward flow speed to the reverse flow speed to form the dynamic flow offset.

6. The method of claim 5, wherein step (b2) further includes the steps of:
   (i) measuring a plurality of flow speeds;
   (ii) averaging the plurality of flow speeds to form the forward flow speed.

7. The method of claim 5, wherein step (b2) further includes the step of subtracting the static flow offset from the flow speed to form the forward flow speed.

8. The method of claim 5, wherein step (b3) further includes the steps of:
   (i) measuring a plurality of flow speeds;
   (ii) averaging the plurality of flow speeds to form the reverse flow speed.

9. The method of claim 5, wherein step (b3) further includes the step of adding the static flow offset to the flow speed to form the reverse flow speed.

* * * * *